United States Patent
Reshef et al.

(10) Patent No.: US 10,034,316 B2
(45) Date of Patent: Jul. 24, 2018

(54) MULTI-DEVICE PAIRING AND PROVISIONING

(71) Applicant: Intel IP Corporation, Santa Clara, CA (US)

(72) Inventors: Ehud Reshef, Kiryat Tivon (IL); Izoslav Tchigevsky, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 120 days.

(21) Appl. No.: 15/147,680

(22) Filed: May 5, 2016

(65) Prior Publication Data
US 2016/0345368 A1    Nov. 24, 2016

Related U.S. Application Data

(63) Continuation of application No. 14/228,569, filed on Mar. 28, 2014, now Pat. No. 9,338,806.

(51) Int. Cl.
| | |
|---|---|
| H04W 76/02 | (2009.01) |
| H04W 8/00 | (2009.01) |
| H04L 29/06 | (2006.01) |
| H04W 12/06 | (2009.01) |
| H04W 76/11 | (2018.01) |

(52) U.S. Cl.
CPC ......... *H04W 76/021* (2013.01); *H04L 63/104* (2013.01); *H04W 8/005* (2013.01); *H04W 12/06* (2013.01); *H04W 76/11* (2018.02)

(58) Field of Classification Search
USPC .................. 455/456.1, 456.2, 434
See application file for complete search history.

(56) References Cited

U.S. PATENT DOCUMENTS

| | | |
|---|---|---|
| 8,295,766 B2 | 10/2012 | Zimbric et al. |
| 8,432,260 B2 | 4/2013 | Talty et al. |
| 9,338,806 B2 | 5/2016 | Reshef et al. |
| 2006/0046719 A1 | 3/2006 | Holtschneider |

(Continued)

OTHER PUBLICATIONS

"U.S. Appl. No. 14/228,569, Non Final Office Action dated Aug. 11, 2015", 17 pgs.

(Continued)

*Primary Examiner* — Ganiyu A Hanidu
(74) *Attorney, Agent, or Firm* — Schwegman Lundberg & Woessner, P.A.

(57) ABSTRACT

Systems, apparatus, and methods to pair a set of accessory devices with a source device through use of a unique device set identifier. Embodiments include a source device adapted to obtain a device set identifier from a device that is part of a set of devices, from a tag, dongle, or code associated with the set of devices, or from a package or carton containing one or more devices of the set of devices, and then automatically pair the source device with each device. Embodiments include a registration process facilitated by the unique device set identifier. The device set identifier including information corresponding to the devices in the set of devices to facilitate registration of the devices, as well as pairing the devices in the set of devices to a source device. Pairing of activation of the set of devices may be conditioned on successful completion of a registration process.

27 Claims, 8 Drawing Sheets

(56) References Cited

U.S. PATENT DOCUMENTS

| | | | |
|---|---|---|---|
| 2006/0071778 A1* | 4/2006 | Vesikivi | G06F 17/30876 |
| | | | 340/539.1 |
| 2007/0156918 A1* | 7/2007 | Philyaw | H04W 76/021 |
| | | | 709/237 |
| 2009/0180451 A1 | 7/2009 | Alpert et al. | |
| 2012/0184242 A1* | 7/2012 | Li | H04L 63/0815 |
| | | | 455/406 |
| 2012/0290730 A1* | 11/2012 | Desai | H04L 67/104 |
| | | | 709/228 |
| 2013/0162160 A1 | 6/2013 | Ganton et al. | |
| 2014/0094189 A1 | 4/2014 | Reshef | |
| 2014/0162683 A1 | 6/2014 | Rochberger et al. | |
| 2015/0282216 A1 | 10/2015 | Reshef et al. | |

OTHER PUBLICATIONS

"U.S. Appl. No. 14/228,569, Notice of Allowance dated Jan. 7, 2016", 17 pgs.

"U.S. Appl. No. 14/228,569, PTO Response to Rule 312 Communication dated Mar. 29, 2016", 2 pgs.

"U.S. Appl. No. 14/228,569, Response filed Dec. 11, 2015 to Non Final Office Action dated Aug. 11, 2015", 10 pgs.

Wyatt, Joshua, et al., "Using TI Technology to Simplify Bluetooth® Pairing Via NFC", Application Report: SLAA512—Texas Instruments, [Online]. Retrieved from the Internet: <URL: http://www.ti.com/lit/an/slaa512/slaa512.pdf>, (Nov. 2011), 25 pgs.

* cited by examiner

MULTI-DEVICE PAIRING AND PROVISIONING

This application is a continuation of U.S. patent application Ser. No. 14/228,569, filed Mar. 28, 2014, now issued as U.S. Pat. No. 9,338,806, which is incorporated herein by reference in its entirety.

BACKGROUND

Pairing two devices for wireless communication often requires a user to perform complicated steps, and often provides limited, if any, security for the communication between the devices. For example, pairing a device such as a smartphone with a compatible wireless accessory (e,g., a BLUETOOTH® compatible device) may call for a user to enter a password or personal identification number (e.g., a PIN). However, generally the user is requested to simply enter either pin that is commonly known, such as "0000" or "1234". Other examples of device paring may include the Wi-Fi Protected Setup (WPS) protocol, or Wi-Fi Direct, which relies on WPS. WPS utilizes a push-button initiated process, or a near field communication (NFC) procedure, to pair two devices for communication. However, the Bluetooth and WPS protocols do not contemplate pairing more than two devices and have been known to have security vulnerabilities.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Systems and methods described herein include techniques and apparatus to pair wireless accessories to a host device. For example, a host device such as a computer, laptop, smart phone, or other device may be paired with a plurality of accessories such as speakers to provide audio distribution throughout a space where the one or more speakers are located. Pairing may include any connection allowing a plurality of devices to exchange data or other information. Current solutions define pairing mechanisms for single protocol entities such as Wi-Fi STA, Wi-Fi Direct Device, Bluetooth Device, or any of the various Institute of Electrical and Electronics Engineers' (IEEE) 802.11 standards, and typically rely on protocol specific identifier such as a MAC address or other device identifier. Therefore, a need exists for pairing procedures for multi-device sets that include complex logical devices, containing multiple "protocol" devices either of some protocol type or implementing different physical protocols. For example, a set of wireless speakers, in a home audio system may include a combination of Bluetooth, WiGig and Wi-Fi compatible devices.

Figure 1:
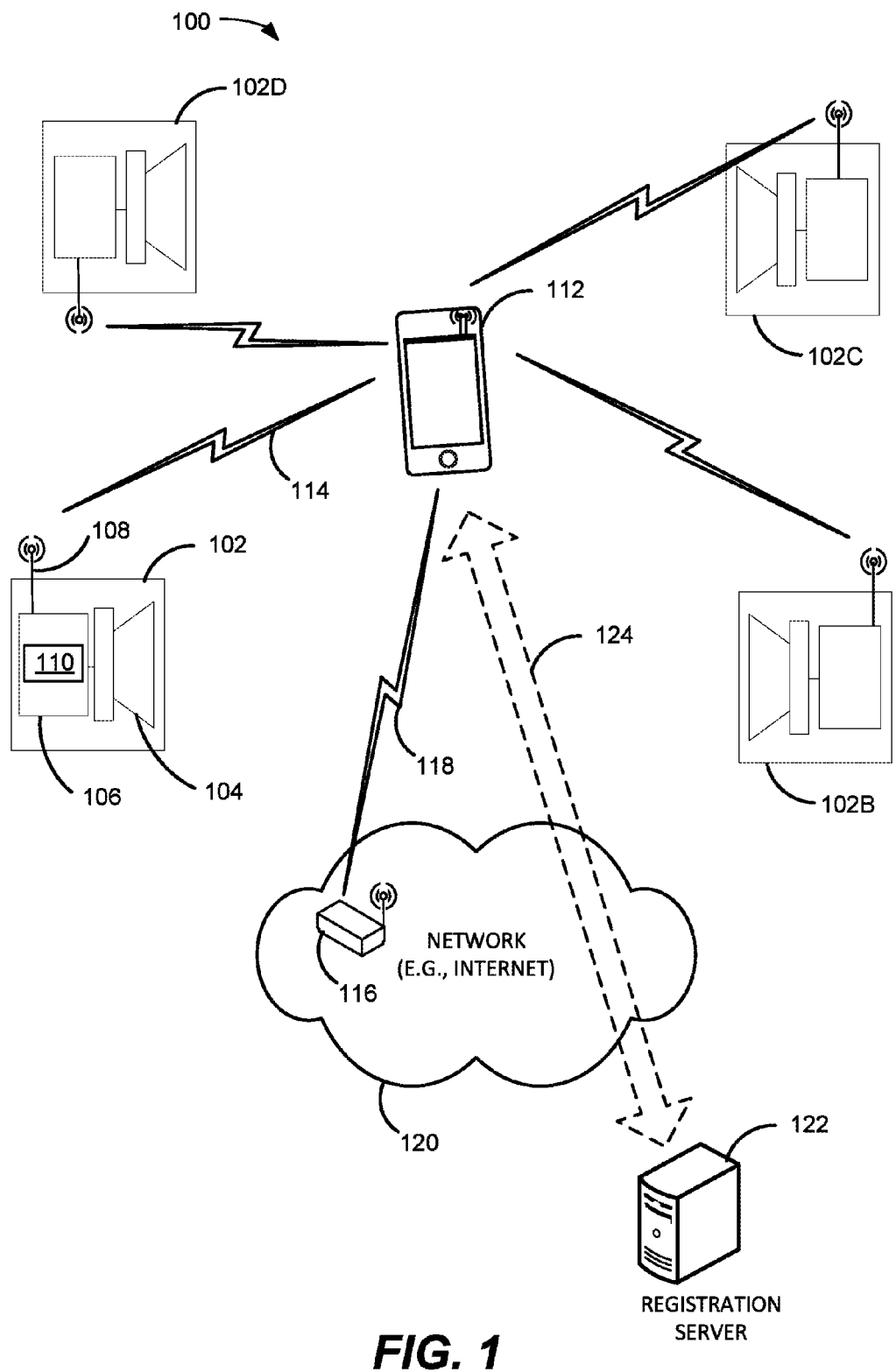
FIG. 1 is a block diagram illustrating an example of a provisioned multi-device system, according to an embodiment.

FIG. 1 is a block diagram illustrating an example of a provisioned multi-device system 100, according to an embodiment. The system 100 may include a device 102 that is part of a device set, or collection of devices (e.g., device 102 and device 102B). The device 102 may, in an example, include a speaker 104, and a communication module 106 adapted to provide an input to the speaker 104. The communication module 106 may be coupled to an antenna 108 such that the receiving module is capable of wireless communication (e.g., transmitting or receiving) of data. The device 102 may include a device specific identifier 110. The device specific identifier 110 may include a unique value that is stored in a memory location e.g., a nonvolatile computer readable memory) of the communication module 106. In various examples, the device specific identifier 110 includes a media access control (MAC) address, a burned-in address (BIA), a private/public key pair, or an Ethernet hardware address (EHA). Additionally, the device specific identifier may additionally or alternatively be printed on an external surface of the device 102 or a label affixed to the external surface, printed on a package containing the device 102, or printed on a pamphlet or manual accompanying device 102.

The device 102 may be part of a set of devices, such as device 102B, device 102C, and device 102D. The set of devices may be physically identical, or vary in on or more characteristics. For example, the set of devices may include a number of speakers configured to work together to provide a surround sound listening experience to a user. In the example depicted in FIG. 1, device 102 may be a right front speaker, device 102B may be a left front speaker, device 102C may be a left rear speaker, and device 102D may he a right rear speaker. The set of devices may all share a common set identifier. The common set identifier may be stored, printed, or affixed in any manner discussed with respect to the device specific identifier 110. The device specific identifier 110 and the common set identifier may, in various examples, be stored, printed, or managed individually, or as a pair.

The set identifier may be unique to the combination of specific devices in the set of devices. The unique set identifier may include a textual code, a bar code, a quick response (QR) code, an near field communication (NFC)

module, a radio frequency id (RFID) tag, or any other identifier embedded in one or more of the devise in the set of devices, or in or on a product package containing or included with the set of devices. The set identifier may be utilized to automate a process of multi-wireless device pairing such that the process is secure and user friendly. The set identifier may also be utilized to provide a seamless mechanism for users to complete device registration process. The unique set identifier may he used to launch a product registration and provisioning application, or access a uniform resource locator (URL) to automate a registration process. A product registration process may be completed as part of the device pairing/provisioning process.

In an example, a source device 112, such as a personal computer, a laptop, a smartphone, a mobile phone, a media player, a radio, or other content continuing device may receiving the set identifier and begin a pairing process. The set identifier may provide a single source mechanism to automate the pairing and provisioning of the multiple devices in the set. The automated pairing mechanism by the source device 112 may be such that only a single user operation is used to initiate the mechanism. The pairing mechanism may include establishing a communication link 114 between the source device 112 and the device 102. The communication link 114 may include any wireless protocol or standard (e.g., Bluetooth, IEEE 802.11a/b/g/n, etc.) that both the source device 112 and the device 102 are capable of utilizing. The specific pairing procedure may be performed according to any wireless standard implemented to establish the communication link 112.

The unique set identifier may include the device specific identifier 110 corresponding to each device 102 in the set such that security may be improved during the pairing or provisioning process. By providing the unique set identifier to the source device 112 in this manner the source device 112 may be adapted to only accent communications or attempt to communicate with devices in the set.

Additionally, the source device 112 may obtain a unique and unknown secret (e.g., a personal identification number) for each of device in the set, thereby further increasing security by allowing authentication between the source device 112 and each individual device 102. In an example, a device vendor or manufacturer may include a mechanism that includes performing the product registration process to completion in order to enable device operation. For example, by supplying a unique unlocking key or other enabling data upon successful registration completion the device operation may be enabled.

The source device 112 may also establish a communication link with a network equipment 116, such as a switch, a router, or other access point, over a second communication link 118. The second communication link 118 may utilize the same protocol as communication link 114, or the second communication link 118 may be an alternate protocol. The source device 112 may communicate with the network equipment 116 to access a network 120, such as the Internet. In an example, the source device 112 may communicate with a registration server 122 over a link 124 that includes the network 120.

The source device 122 may transmit the set identifier or a derivative to the registration server 122 to establish that the devices 102 have been paired with the source device 122. The source device 122 may provide additional registration information to the registration server. In an example, the source device 122 may prompt a user for the additional registration information, such as the user's name, address, e-mail address, or other contact information. The successful verification of the additional registration information may condition the use of the set of devices.

Figure 2:
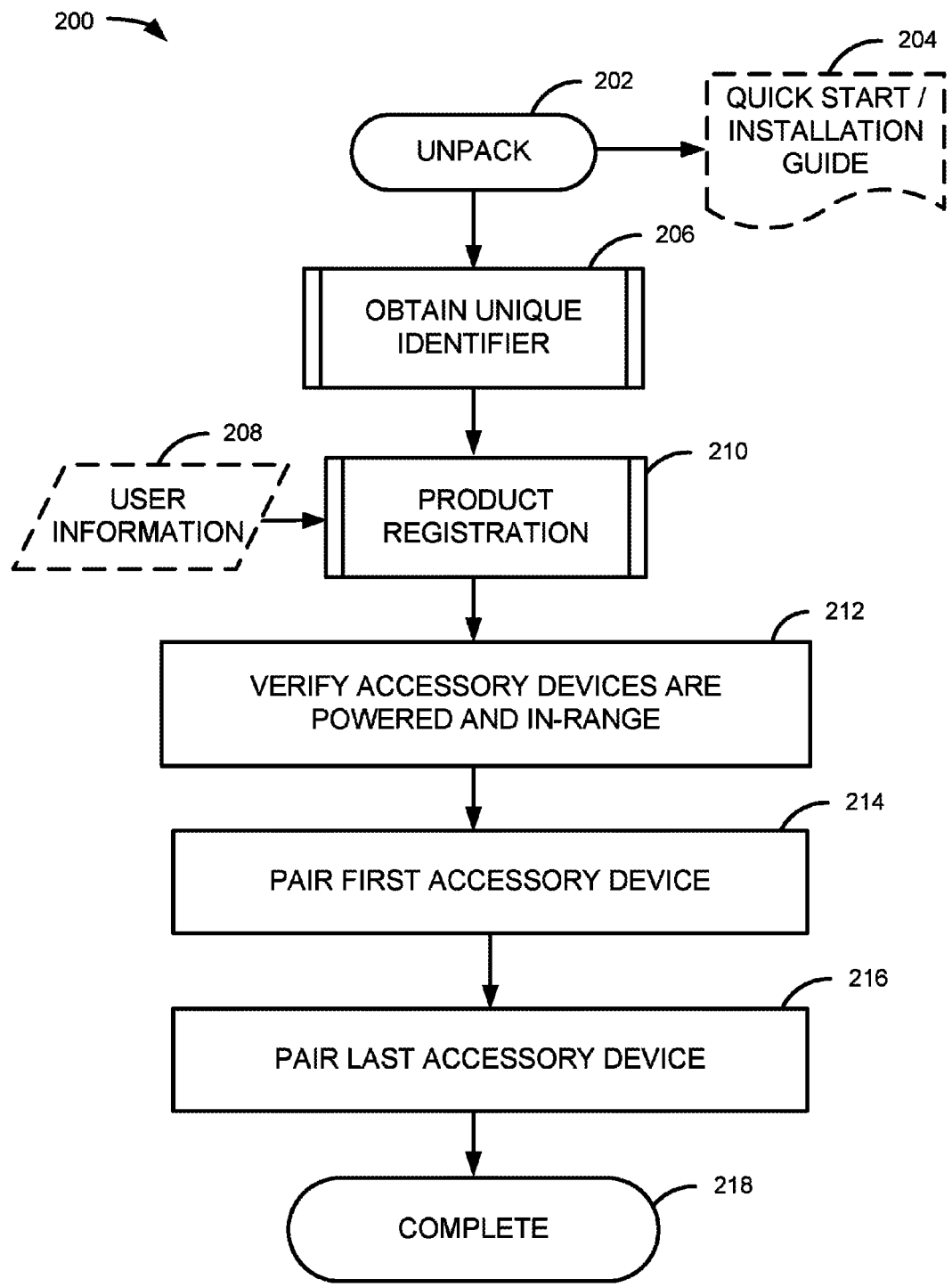
FIG. 2 is a flow diagram illustrating an example of a provisioning scheme, according to an embodiment.

FIG. 2 is a flow diagram illustrating an example of a provisioning scheme 200, according to an embodiment. At 202, a package or carton may contain a wireless accessory, such as the device 102 of FIG. 1, or a set of accessories, and also include a unique identifier that when accessed by the source device 112 may initiate the provisioning scheme 200. The package or carton may also optionally contain a quick start guide or an installation guide 204 that may provide information to a user such as how to initiate pairing of the wireless accessory, or set of accessories, with a source device, such as the source device 112 of FIG. 1.

At 206, the source device 112 may obtain a unique identifier associated with the wireless accessory, or set of accessories. The unique identifier may be embedded in the device packaging, attached to one of the accessories in the package, or be included in or on an extra device in the packaged set. The unique identifier may be embodied as a textual sequence that may be entered by a user into an application executing on the source device 112.

For example, the source device may include a dedicated application that is auto-launched upon receipt of the unique identifier indicating an associate with the dedicated application. The unique identifier may include a QR Code, a tiny URL or any other identification code, which when scanned, received by, or input into a device will cause a device to automatically pair the accessory, or set of accessories, and launch a dedicated web page for registration. The unique identifier may be include an NFC tag having information, such as accessory protocol compatibility or accessory type and model information, that may be utilized for pairing. The unique identifier may include a universal serial bus (USB) dongle with the dedicated application and the unique identifier. The USB dongle may be connected to a source device capable of executing the dedicated application, receiving the unique identifier, and pairing with the wireless accessory. Other medium, such as a read only memory, may also be utilized to obtain the unique identifier for pairing the set with a source device.

At 210, product registration may be performed. The product registration may include transmitting the unique identifier to a registration server. The registration server may request additional user information. Optionally, at 208, the user information may be requested to complete the product registration.

At 212, a source device may verify that the accessory devices are powered and in-range of the source device. The verification may be performed in accordance with any appropriate wireless communication protocol supported by the accessory devices. The communication protocol supported by the accessory devices may be included in the unique identifier.

At 214, the source device is automatically paired with the first accessory device. The first accessory device may provide additional information to the source device. For example, the first accessory device may provide a unique value identifying a second or subsequent accessory device included in the set of accessories. The source device may then pair with the second or subsequent accessory device.

At 216, the source device is automatically paired with the last accessory device. At 218, the paring and registration process is complete. The combination of the accessory device registration with the provisioning/pairing mechanism as a single automated process, may be utilized to automate the pairing of multiple devices in the accessory set as a single continuous process requiring minimal (or no) user intervention beyond the initial inputs of the unique set identifier.

Though arranged serially in the example of FIG. 2, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 3:
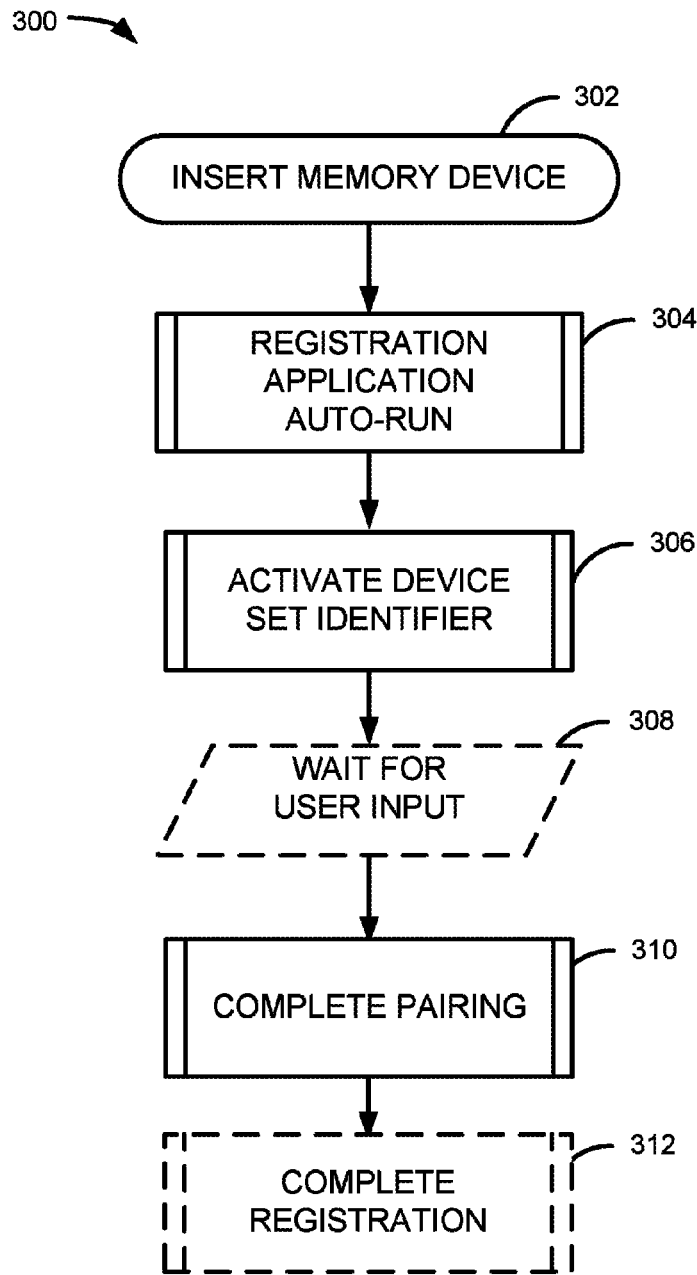
FIG. 3 is a flow diagram illustrating an example scheme for providing a device set identifier and application to a source device, according to an embodiment.

FIG. 3 is a flow diagram illustrating an example scheme 300 for providing a device set identifier and application to a source device, according to an embodiment.

At 302, a computer readable memory device, such as a USB dongle, a compact flash card, a secure digital memory card, or another device including a tangible computer readable medium is inserted into the source device. In an example, the memory device may contain a registration application or instructions, that when executed by the source device performs device pairing and registration operations.

At 304, the registration application is automatically executed by the source device. In an example, the source device may prompt a user of the source device for permission to execute the registration application.

At 306, the registration application activates the device set identifier. The device set identifier may be included in the memory device, for example in an encrypted file, an unencrypted file, or another non-volatile computer readable memory location. The registration application may request input from a user to complete the registration process. The request may include a prompt for a name, an address, an e-mail address, a telephone number, or other information.

At 308, the source device may optionally wait until input is received from the user before continuing or completing the pairing or registration process. In an example, the source device may attempt to establish an initial communication link with a first device of the set of devices in a background task or process.

At 310, the source device may complete the pairing process. The completion of the pairing process may include successful automated pairing of the source device with each accessory device in the set of devices associated with the set identifier.

At 312, the source device may complete the optional registration process. The registration process may include, for example, transmitting the user provided input and the device net identifier to a registration server.

Though arranged serially in the example of FIG, 3, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 4:
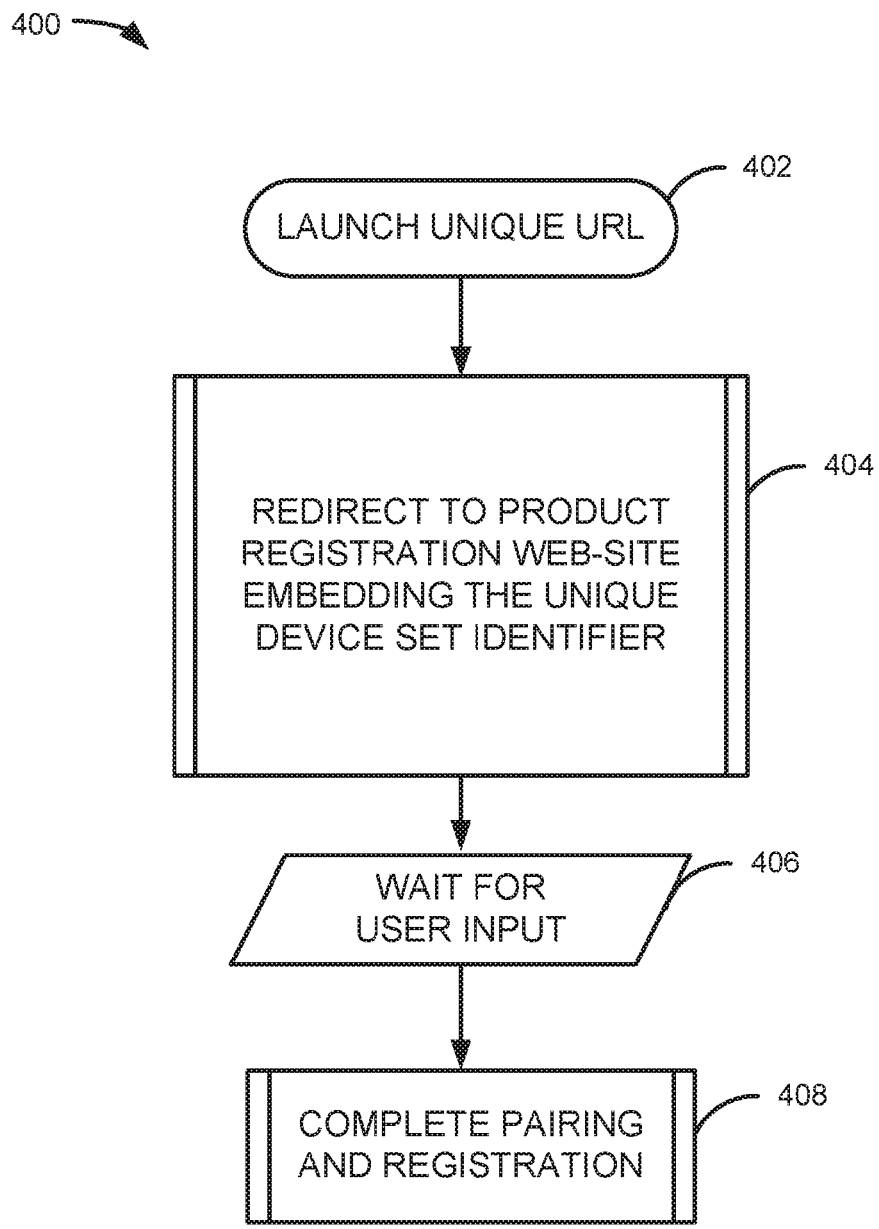
FIG. 4 is a flow diagram illustrating an example scheme for facilitating device registration, according to an embodiment.

FIG. 4 is a flow diagram illustrating an example scheme 400 for facilitating device registration, according to an embodiment. At 402, a source device may launch (e.g., with a web browser) a unique URL. The unique URL may be embedded in an identifier associated with a set of device. In an example, the unique URL may be provided in a quick start guide or instruction manual included with a set of devices.

At 404, the unique URL may redirect a user (e.g., through the web browser) to a product registration web site and embedded the unique device set identifier in the URL. The device set identifier may include a unique identifier for each individual device in the device set.

At 406, the source device may wait until input is received from the user before continuing or completing the pairing or registration process. In an example, the source device may attempt to establish an initial communication link with a first device of the set of devices in a background task or process.

At 408, the source device may complete the pairing and registration process. The completion of the pairing process may include successful automated pairing of the source device with each accessory device in the set of devices associated with the set identifier.

Figure 5:
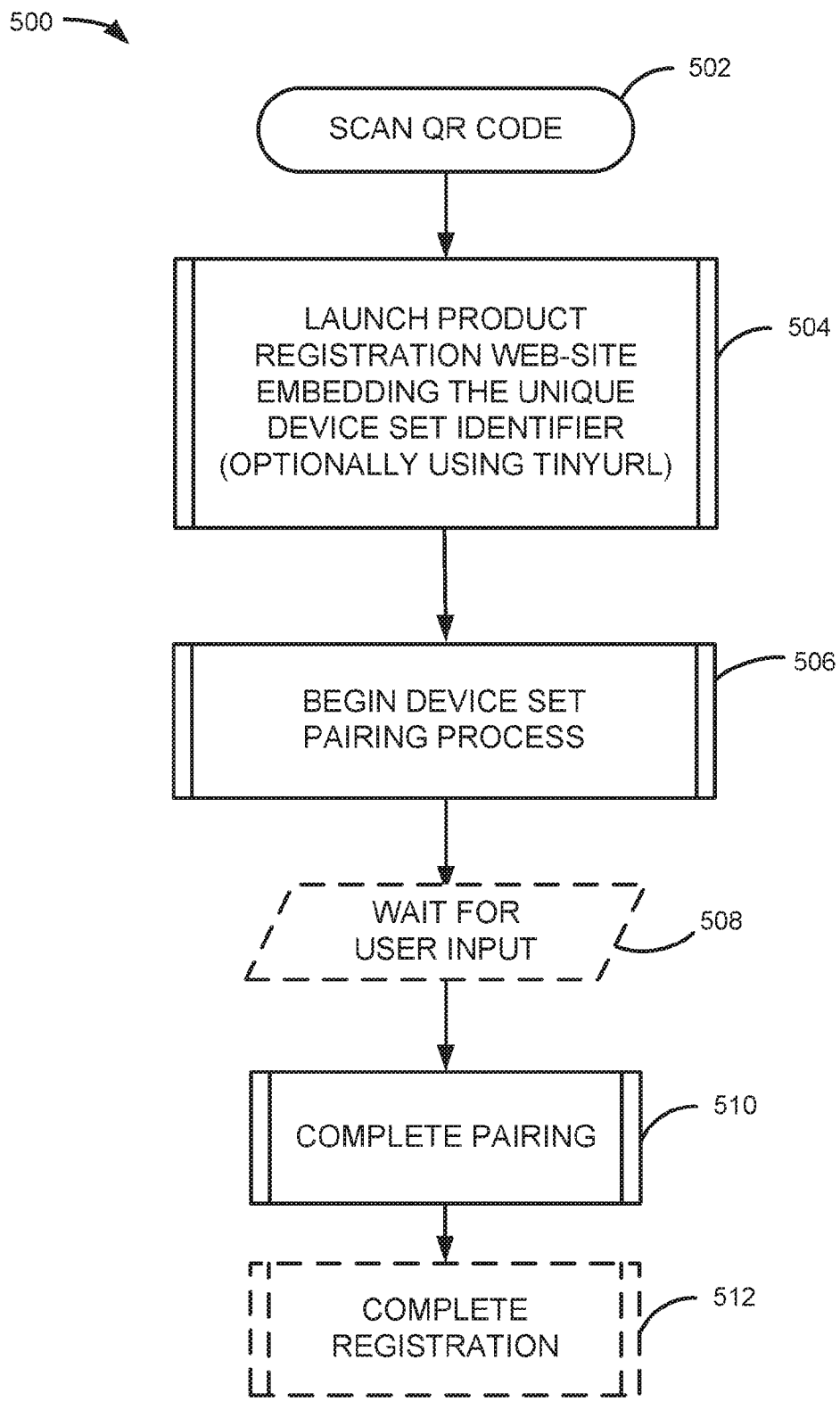
FIG. 5 is a flow diagram illustrating an example scheme for facilitating device pairing and optional registration, according to an embodiment.

FIG. 5 is a flow diagram illustrating an example scheme 500 for facilitating device pairing and optional registration, according to an embodiment. At 502, a source device may scan a Quick Response (QR) code. The QR code may include a unique device set identifier and a link to a product registration web-site. The link to the product registration web-site may optionally be implemented using a Tiny URL or other appropriate linking mechanism.

At 504, the source device may interpret or decode the QR code and launch a web-browser or other application to load the product registration web-site. The launch may include embedding the unique device set identifier in a request to the product registration web-site.

At 506, the source device may begin a device set pairing process. For example, the source device may attempt to establish an initial communication link with a first device of the set of devices in a background task or process.

At 508, the source device may optionally wait until an input is received from the user before continuing or completing the pairing or registration process. For example, the source device may present the user with a user interface requesting the input. The user input may include a name, an address, an e-mail address, telephone number, or other information.

At 510, the source device may complete the pairing process. The completion of the pairing process may include successful automated pairing of the source device with each accessory device in the set of devices associated with the set identifier.

At 512, the source device may complete the optional registration process. The completion of the registration process may include successfully transmitting the user input (e.g., registration information) to a registration data center, such as registration server 122 of FIG. 1.

FIG. 4 and FIG. 5 depict an example use of application or web-site however these are given by example as they are the simplest to describe, and there are numerous other ways to accomplish similar results. Though arranged serially in these examples, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 6:
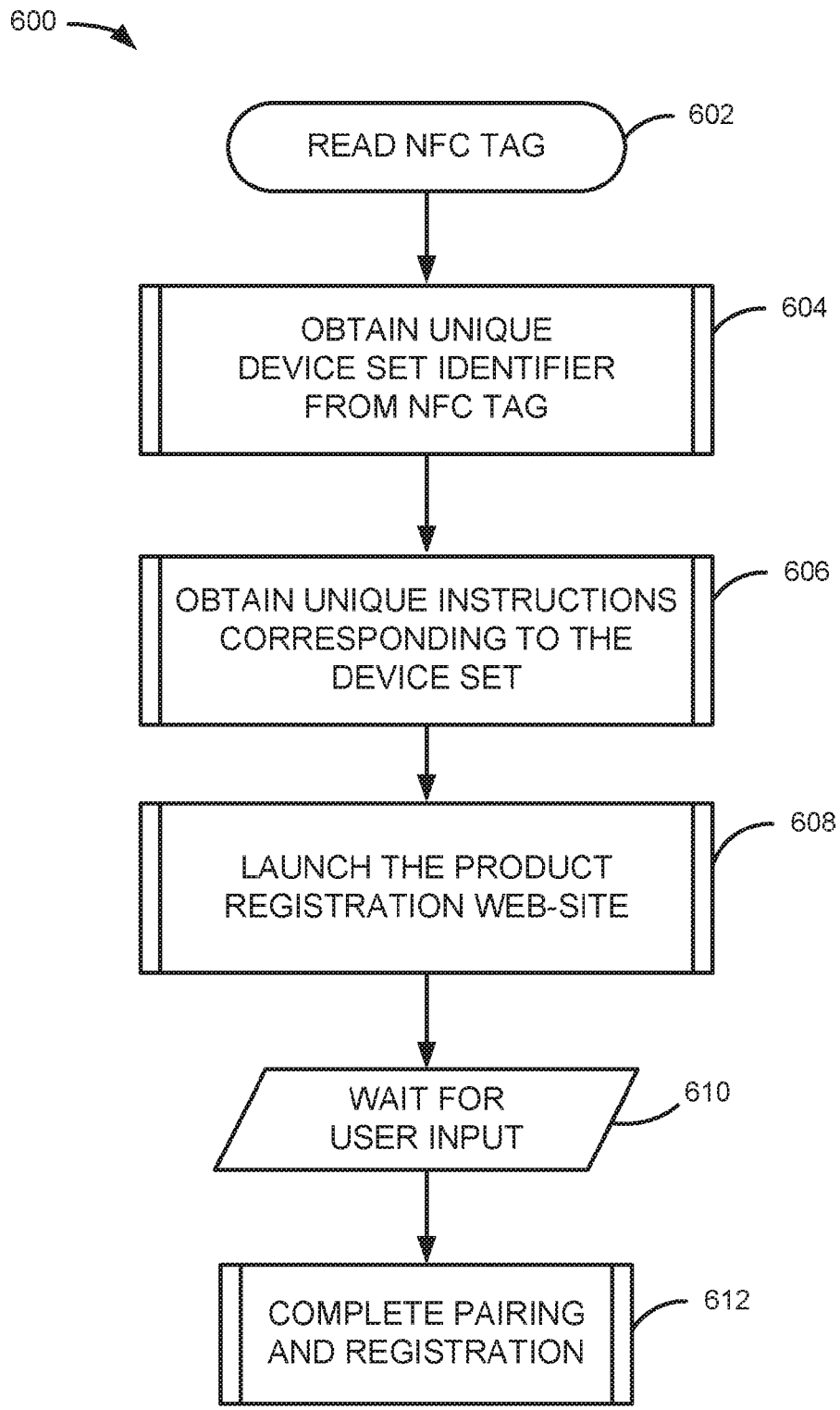
FIG. 6 is a flow diagram illustrating an example scheme for facilitating device registration, according to an embodiment.

FIG. 6 is a flow diagram illustrating an example scheme for facilitating device registration, according to an embodiment. At 602, a source device may read a near field communication (NFC) tag. At 604, the source device may obtain a unique device set identifier from the NFC tag. In addition to the unique device set identifier, the NFC tag may include information specific to one or more of the individual devices in the device set. For example, the NFC tag may include device specific identifiers, device models, types or descriptions, or other device information.

At 606, the source device may obtain a unique instructions corresponding to the device set. For example, the instructions may include a software application or device driver adapted to utilize or provide functionality for use with one or all of the devices in the device set. In various examples, the source device may determine an attribute, functionality or capability of each device in the device set. For example, the source device may determine a speaker size and frequency response characteristics of each individual speaker in a set of speakers, e.g., in a home-audio environment. In another example, the source device may determine the functionality of each device in a docking station set of devices that may include a monitor, display, keyboard, mouse, speaker(s), camera, video camera, network interface, or other input or output devices.

At 608, the source device may launch a web-browser or other application to load the product registration web-site. The launch may include embedding the unique device set identifier in a request to the product registration web-site.

At 610, the source device may prompt a user for a registration input, and wait until the registration input is received from the user. The source device may condition receiving the registration input and completing registration process before the pairing process is completed or before the source device is authorized to use or communicate with devices in the device set.

At 612, the source device may complete the pairing and registration process. The completion of the pairing process may include successful automated pairing of the source device with each accessory device in the set of devices associated with the set identifier.

Figure 7:
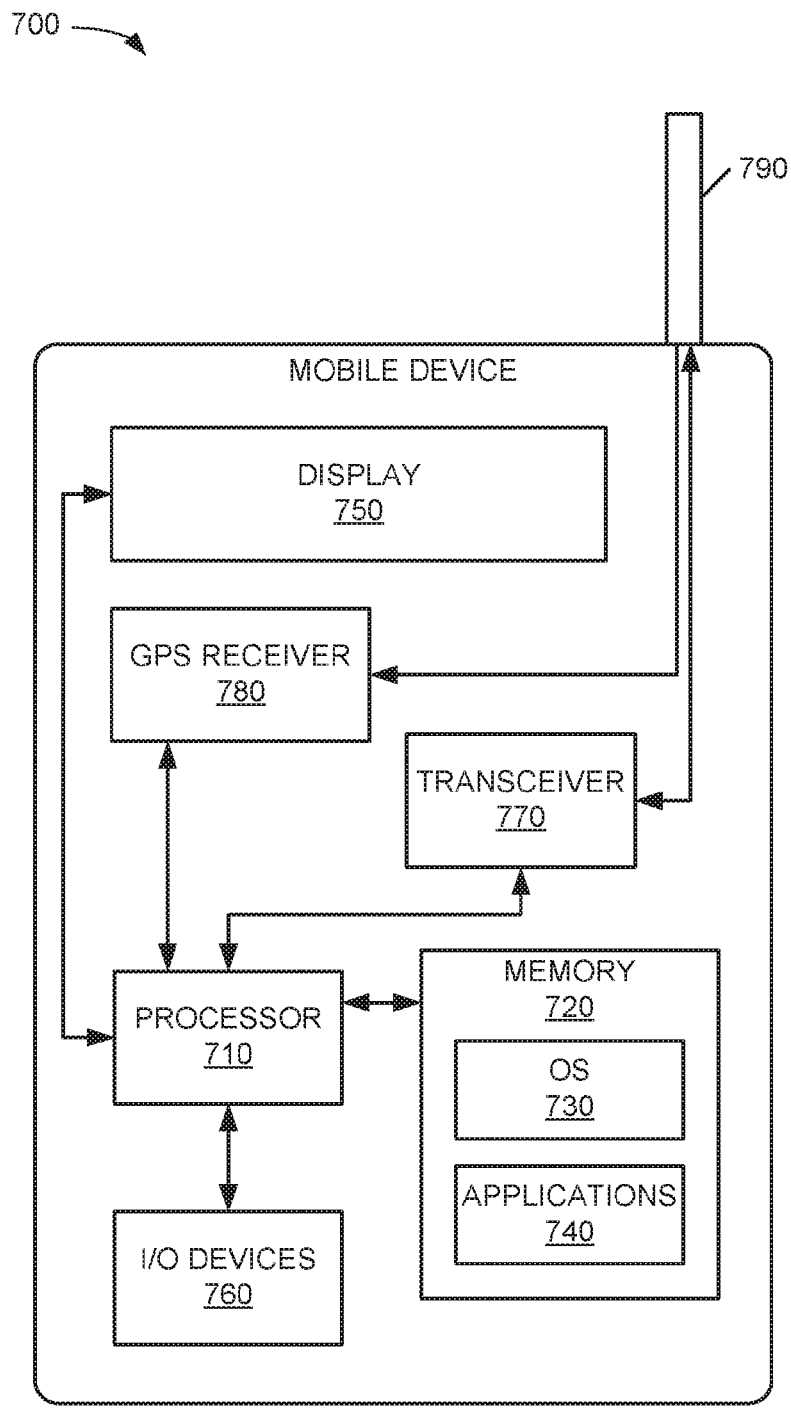
FIG. 7 is a block diagram illustrating a mobile device, upon which any one or more of the techniques (e.g., methodologies) discussed herein may be performed.

FIG. 7 is a block diagram illustrating a mobile device 700, upon which any one or more of the techniques (e.g., methodologies) discussed herein may be performed. The mobile device 700 may include a processor 710. The processor 710 may be any of a variety of different types of commercially available processors suitable for mobile devices, for example, an XScale architecture microprocessor, a Microprocessor without Interlocked Pipeline Stages (MIPS) architecture processor, a reduced instruction set computing architecture processor, or another type of processor. A memory 720, such as a Random Access Memory (RAM), a Flash memory, or other type of memory, is typically accessible to the processor 710. The memory 720 may be adapted to store an operating system (OS) 730, as well as application programs 740. The OS 730 or application programs 740 may include instructions stored on a computer readable medium (e.g., memory 720) that may cause the processor 710 of the mobile device 700 to perform any one or more of the techniques discussed herein. The processor 710 may be coupled, either directly or via appropriate intermediary hardware, to a display 750 and to one or more input/output (I/O) devices 760, such as a keypad, a touch panel sensor, a microphone, etc. Similarly, in an example embodiment, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the mobile device 700. For example, the transceiver may be configured to transmit and receive signals that are compatible with one or more Wi-Fi, WiGig, Bluetooth, or RFID standards as discussed herein. Further, in some configurations, a GPS receiver 780 may also make use of the antenna 790 to receive GPS signals.

Figure 8:
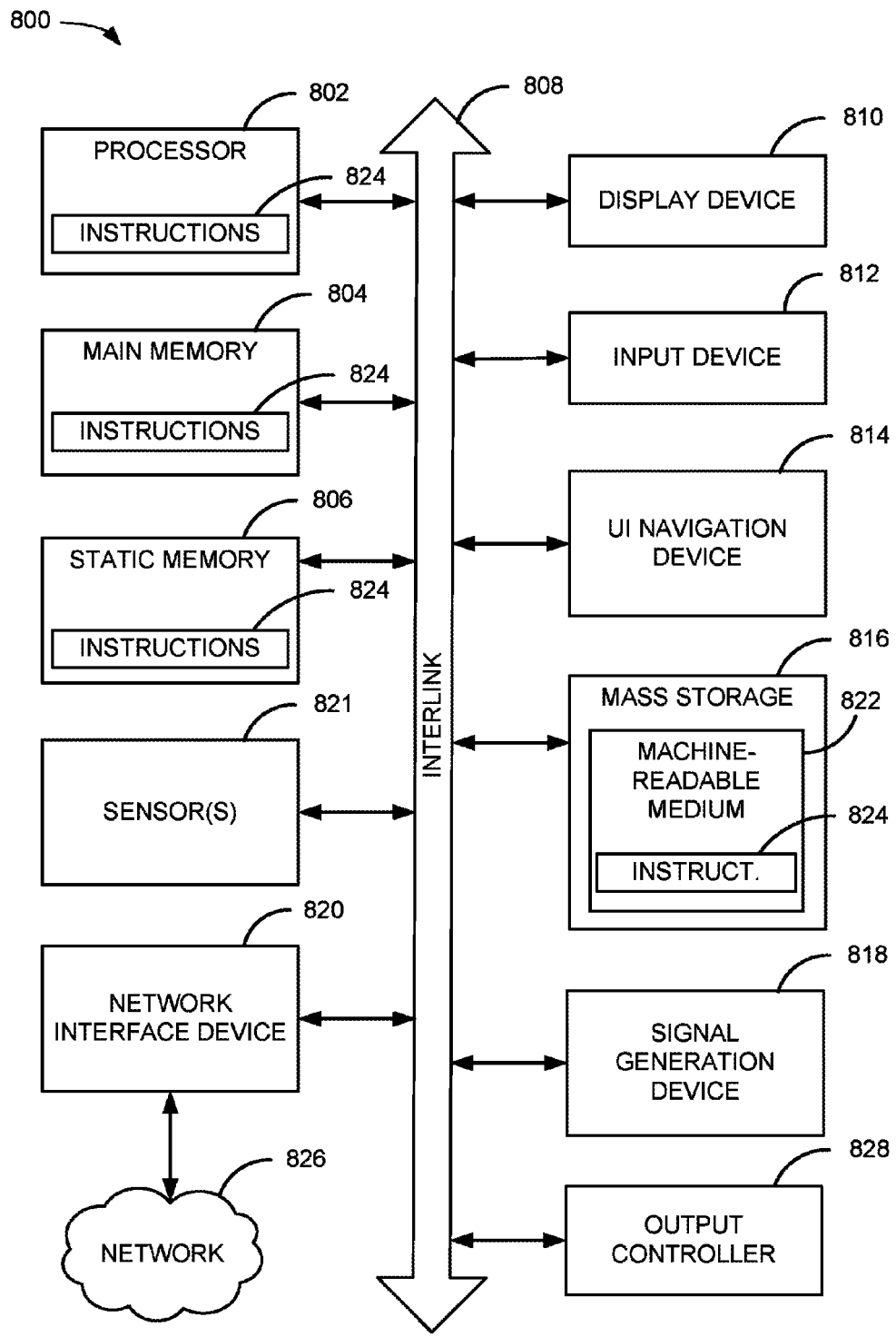
FIG. 8 is a block diagram illustrating an example machine upon which any one or more of the techniques discussed herein may be performed.

FIG. 8 is a block diagram illustrating an example machine 800 upon which any one or more of the techniques (e.g., methodologies) discussed herein may be performed. In alternative embodiments, the machine 800 may operate as a standalone device or apparatus, or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules or components are tangible entities capable of performing specified operations and may be configured or arranged in a certain manner. In an example, circuits may be arranged (e.g., internally or with respect to external entities such as other circuits) in a specified manner as a module or component. In an example, the whole or part of one or more computer systems (e.g., a standalone, client or server computer system) or one or more hardware processors may be configured by firmware or software (e.g., instructions, an application portion, or an application) as a module/component that operates to perform specified operations. In an example, the software may reside (1) on a non-transitory machine-readable medium or (2) in a transmission signal. In an example, the software, when executed by the underlying hardware of the module/component, causes the hardware to perform the specified operations.

Accordingly, the terms "module" and "component" are understood to encompass a tangible entity, be that an entity that is physically constructed, specifically configured e.g., hardwired), or temporarily (e.g., transitorily) configured (e.g., programmed) to operate in a specified manner or to perform part or all of any operation described herein. Considering examples in which modules/components are temporarily configured, each of the modules/components need not be instantiated at any one moment in time. For example, where the modules/components comprise a general-purpose hardware processor configured using software, the general-purpose hardware processor may be configured as respective different modules/components at different times. Software may accordingly configure a hardware processor, for example, to constitute a particular module/component at one instance of time and to constitute a different module at a different instance of time.

Machine (e.g., computer system) 800 may include a hardware processor 802 (e.g., a processing unit, a graphics processing unit (GPU), a hardware processor core, or any combination thereof), a main memory 804, and a static memory 806, some or all of which may communicate with each other via a link 808 (e.g., a bus, link, interconnect, or the like). The machine 800 may further include a display device 810, an input device 812 (e.g., a keyboard), and a user interface (UI) navigation device 814 (e.g., a mouse). In an example, the display device 810, input device 812, and UI navigation device 814 may be a touch screen display. The machine 800 may additionally include a mass storage (e.g., drive unit) 816, a signal generation device 818 (e.g., a speaker), a network interface device 820, and one or more sensors 821, such as a Global Navigation Satellite System (GNSS) or global positioning system (GPS) sensor, camera, video recorder, compass, accelerometer, or other sensor. The machine 800 may include an output controller 828, such as a serial (e.g., universal serial bus (USB), parallel, or other wired or wireless infrared (IR)) connection to communicate or control one or more peripheral devices (e.g., a printer, card reader, etc.).

The mass storage 816 may include a machine-readable medium 822 on which is stored one or more sets of data structures or instructions 824 (e.g., software embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage 816 may constitute machine readable media.

While the machine-readable medium 822 is illustrated as a single medium, the term "machine readable medium" may include a single medium or multiple media (e.g., a centralized or distributed database, and/or associated caches and servers) that configured to store the one or more instructions 824. The term "machine-readable medium" may include any tangible medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Various Notes & Examples

The following examples pertain to further embodiments. Specifics in the examples may be used anywhere in one or more embodiments.

Example 1 includes subject matter such as an apparatus, a method, a means for performing acts, or a machine readable medium including instructions that, when performed by the machine, that cause the machine to perform acts), comprising: an input device; a communication module; and a processor coupled to the communication module and the input device, the processor arranged to: receive an input from the input device, the input corresponding to a plurality of devices having a capability to communicate with the communication module; and wherein the communication module is arranged to establish a connection with each one of the plurality of devices based at least in part on the input, and pair each one of the plurality of devices with the apparatus; wherein the processor is arranged to determine a functionality of each one of the plurality of devices via the connection and transmit data to each one of the plurality of devices based at least in part on the functionality of each one of the plurality of devices.

In Example 2, the subject matter of Example 1 may optionally include, wherein the input device is at least one of: a universal serial bus port, a camera, a keyboard, a touch screen, a push button, a radio-frequency identifier reader, a near field communication reader, a QR code reader, or a bar code reader.

In Example 3 the subject matter of any one or more of Examples 1 to 2 may optionally include, wherein the input includes an identifier that is common to each one of the plurality of devices.

In Example 4 the subject matter of any one or more of Examples 1 to 3 may optionally include, wherein the identifier includes a QR Code, identification code, or a tiny URL that when received by the processor cause the processor to automatically pair the plurality of devices to the apparatus.

In Example 5 the subject matter of any one or more of Examples 1 to 4 may optionally include, wherein the input includes an embedded network address, and the processor is configured to establish a connection with a computing device at the embedded network address.

In Example 6 the subject matter of any one or more of Examples 1 to 5 may optionally include, wherein the input includes: an application and a unique identifier, the application including instructions to adapt the processor to provide the unique identifier to a computing device over a network connection.

In Example 7 the subject matter of any one or more of Examples 1 to 6 may optionally include, a user interface coupled to the processor; wherein the processor is adapted to receive registration information via the user interface, and transmit the registration information to the computing device.

In Example 8, the subject matter of any one or more of Examples 1 to 7 may optionally include, wherein the registration information includes contact information associated with a user of the plurality of devices.

In Example 9 the subject matter of any one or more of Examples 1 to 8 may optionally include, instructions that when executed by the computing device cause the computing device to: wherein operation of the plurality of devices by the apparatus is conditioned on receiving the registration information.

In Example 10 includes subject matter such as an apparatus, a method, a means for performing acts, or a machine readable medium including instructions that, when performed by the machine, that cause the machine to perform acts), to: receive a unique identifier corresponding to a plurality of devices; establish a connection with a first one of the plurality of devices, the connection being based at least in part on a content of the unique identifier; determine a functionality of the first device over the connection; automatically establish a connection with each subsequent device in the plurality of devices; and pair each one of the plurality of devices with the computing device.

In Example 11 the subject matter of Example 10 may optionally include, instructions that when executed by the computing device cause the computing device to: obtain information about each subsequent device from the first device.

In Example 12 the subject matter of any one or more of Examples 10 to 11 may optionally include, wherein establishing the connection with each subsequent device in the plurality of devices is based at least in part on information about each subsequent device.

In Example 13 the subject matter of any one or more of Examples 10 to 12 may optionally include, instructions that when executed by the computing device cause the computing device to: connect to a server; and obtain information or instructions corresponding to the plurality of devices from the server.

In Example 14 the subject matter of any one or more of Examples 10 to 13 may optionally include, instructions that when executed by the computing device cause the computing device to: register each one of the plurality of devices with the server.

In Example 15 the subject matter of any one or more of Examples 10 to 14 may optionally include, instructions that when executed by the computing device cause the computing device to: display a prompt requesting registration information; wherein the registration of reach one of the plurality of devices with the server includes sending the registration information to the server.

In Example 16 the subject matter of any one or more of Examples 10 to 15 may optionally include, wherein operating the devices in the set of devices is conditioned on receiving the registration information.

Example 17 includes subject matter for social relationship identification (such as a method, means for performing acts, machine readable medium including instructions that when performed by a machine cause the machine to performs acts, or an apparatus configured to perform comprising: receiving, via an input mechanism of an apparatus, a unique identifier corresponding to a plurality of devices; establishing a connection between the apparatus and a first one of the plurality of devices, the connection being based at least in part on a content of the unique identifier; determining, by the apparatus, a functionality of the first device over the connection; and automatically establishing a connection between the apparatus and each subsequent device in the plurality of devices; and pairing each one of the plurality of devices with the apparatus.

In Example 18, the subject matter of Example 17 may optionally include, obtaining, by the apparatus, information about each subsequent device from the first device.

In Example 19 the subject matter of any one or more of Examples 17 to 18 may optionally include, wherein establishing the connection with each subsequent device in the plurality of devices is based at least in part on information about each subsequent device.

In Example 20 the subject matter of any one or more of Examples 17 to 19 may optionally include, establishing a link between the apparatus and a server; and obtaining, by the apparatus over the link, information or instructions corresponding to the plurality of devices from the server.

In Example 21 the subject matter of any one or more of Examples 17 to 20 may optionally include, registering, by the apparatus, each one of the plurality of devices with the server.

In Example 22 the subject matter of any one or more of Examples 17 to 21 may optionally include, prompting, by the apparatus, a user for registration information; wherein registering each one of the plurality of devices with the server includes transmitting the registration information from the apparatus to the server.

In Example 23 the subject matter of any one or more of Examples 17 to 22 may optionally include, wherein operating the devices in the set of devices is conditioned on receiving the registration information.

Example 24 includes a tangible machine-readable medium including instructions that when performed by a machine cause the machine to perform any one of the examples of 17-23.

Example 25 includes an apparatus comprising means for performing any of the methods of claims 17-23.

Example 26 includes subject matter for providing a multi-device pairing and provisioning means for performing any one of the examples of 1-23.

Example 27 includes subject matter such as a device, apparatus, or machine) comprising a system to provide social relationship identification, comprising: means for receiving, via an input mechanism of an apparatus, a unique identifier corresponding to a plurality of devices; means for establishing a connection between the apparatus and a first one of the plurality of devices, the connection being based at least in part on a content of the unique identifier; means for determining, by the apparatus, a functionality of the first device over the connection; means for automatically establishing a connection between the apparatus and each subsequent device in the plurality of devices; and means for pairing each one of the plurality of devices with the apparatus.

In Example 28, the subject matter of Example 27 may optionally include, wherein means for obtaining, by the apparatus, information about each subsequent device from the first device.

In Example 29, the subject matter of any one or more of Examples 27 to 28 may optionally include, wherein establishing the connection with each subsequent device in the plurality of devices is based at least in part on information about each subsequent device.

In Example 30, the subject matter of any one or more of Examples 27 to 29 may optionally include, wherein means for establishing a link between the apparatus and a server;

and means for obtaining, by the apparatus over the link, information or instructions corresponding to the plurality of devices from the server.

In Example 31, the subject matter of any one or more of Examples 27 to 30 may optionally include, wherein means for registering, by the apparatus, each one of the plurality of devices with the server.

In Example 32, the subject matter of any one or more of Examples 27 to 31 may optionally include, wherein means for displaying, by the apparatus, a prompt requesting registration information; wherein registering each one of the plurality of devices with the server includes a means for transmitting the registration information from the apparatus to the server.

In Example 33, the subject matter of any one or more of Examples 27 to 32 may optionally include, wherein operating the devices in the set of devices is conditioned on receiving the registration information.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus comprising:
   a memory; and
   a processor coupled to the memory, wherein the processor is configured to:
   decode an input signal comprising a single set identifier for two or more wireless devices;
   cause to be sent the single set identifier to a server, wherein the single set identifier is to be used by the server to identify two or more identifiers that enable the apparatus to establish a connection with the two or more wireless devices;
   in response to the single set identifier being sent to the server, decode a packet from the server comprising two or more identifiers;
   cause the connection to be established with each of the two or more wireless devices using the corresponding identifier of the two or more identifiers; and
   in response to the connection being established with one of the two or more wireless devices, decode information from the one of the one of the two or more wireless devices.

2. The apparatus of claim 1, wherein the two or more identifiers are each a wireless address of the corresponding two or more wireless devices.

3. The apparatus of claim 1, wherein the processor is configured to:
   cause to be sent the single set identifier to a server;
   in response to sending the single set identifier, decode a packet from the server comprising an indication of an application; and
   use the application to communicate with the two or more wireless devices.

4. The apparatus of claim 1, wherein the single set identifier comprises two or more identifiers for the corresponding wireless device of the two or more wireless devices.

5. The apparatus of claim 1, wherein the input signal comprises two or more embedded network addresses of the two or more wireless devices; and
   wherein the processor is configured to establish the connection with each of the two or more wireless devices using the corresponding embedded network address.

6. The apparatus of claim 1, wherein the input signal is received from one of the two or more wireless devices.

7. The apparatus of claim 1, wherein the input signal further comprises a unique product registration identifier, and wherein the processor is configured to:
   cause a prompt to be displayed on a computer display for product registration information;

in response to receiving the product registration information, cause to be sent the unique product registration identifier and the product registration information to a registration server; and in response to sending the unique product registration identifier and the product registration information to the registration server, decode a unique unlocking key to use to communicate with the two or more wireless devices from the registration server.

8. The apparatus of claim 1, wherein the processor is configured to:
cause to be sent the single set identifier to a registration server; and
decode capability or functional information for each of the two or more wireless devices from the registration server.

9. The apparatus of claim 8, wherein the processor is further configured to:
communication with the two or more wireless devices in accordance with the capability or functional information.

10. The apparatus of claim 1, wherein the input signal further comprises a unique universal resource locator (URL), and wherein the processor is further configured to:
access a webpage with the unique URL, wherein the webpage is a registration webpage for the two or more wireless devices.

11. The apparatus of claim 1, wherein the processor is further configured to:
determine a functionality of each of the two or more wireless devices via a connection with one of the two or more wireless devices; and
transmit data to each of the two or more wireless devices using the corresponding functionality.

12. The apparatus of claim 1, further comprising an input device coupled to the processor and the memory, wherein the processor is configured to receive the input signal from the input device, and wherein the input device is at least one of: a universal serial bus port, a camera, a keyboard, a touch screen, a push button, a radio-frequency identifier reader, a near field communication reader, a QR code reader, or a bar code reader.

13. The apparatus of claim 1, wherein the input signal comprises a QR Code, identification code, or a universal resource locator (URL) that when received by the processor causes the processor to automatically pair the plurality of devices to the apparatus.

14. The apparatus of claim 1, wherein the input signal comprises an embedded network address of a registration server; and the processor is configured to establish a connection with the registration server at the embedded network address.

15. The apparatus of claim 1, wherein the input signal comprises an identification of an application, and wherein the processor is configured to use the application to communicate with the two or more wireless devices.

16. The apparatus of claim 15, wherein the input signal comprises a product specific identifier, and wherein the processor is configured to use the product specific identifier to retrieve an application to use to communicate with the two or more wireless devices.

17. The apparatus of claim 1, wherein the apparatus and the two or more wireless devices are each configured to operate in accordance with one or more of the following: Institute of Electrical and Electronic Engineers (IEEE) 802.11 or Bluetooth.

18. A non-transitory computer-readable storage medium that stores instructions for execution by one or more processors, the instructions to configure the one or more processors to:
decode an input signal comprising a single set identifier for two or more wireless devices;
cause to be sent the single set identifier to a server, wherein the single set identifier is to be used by the server to identify two or more identifiers that enable the apparatus to establish a connection with the two or more wireless devices;
in response to the single set identifier being sent to the server, decode a packet from the server comprising two or more identifiers;
cause the connection to be established with each of the two or more wireless devices using the corresponding identifier of the two or more identifiers; and
in response to the connection being established with one of the two or more wireless devices, decode information from the one of the one of the two or more wireless devices.

19. The non-transitory computer-readable storage medium of claim 18, wherein the server is a registration server.

20. The non-transitory computer-readable storage medium of claim 19, wherein the instructions configure the one or more processors to:
decode a packet from the registration server comprising an indication of an application; and use the application to communicate with the two or more wireless devices.

21. An apparatus of a wireless device, the apparatus comprising:
memory, and a processor coupled to the memory, wherein the memory is configured to store a single set identifier for two or more wireless devices, and wherein the processing is configured to:
cause to be transmitted the single set identifier to a source device, wherein the single set identifier comprises information to enable the source device to establish a wireless connection with the two or more wireless devices;
decode a packet from the source device; and
cause to be transmitted to the source device the additional information for the source device to communicate with at least one more of the two or more wireless devices.

22. The apparatus of claim 21, wherein the single set identifier comprises an identification of an application for the source device to use to communicate with the two or more wireless devices.

23. The apparatus of claim 21, wherein the single set identifier comprises two or more identifiers, wherein the two or more identifiers are each a wireless address of a corresponding wireless device of the two or more wireless devices.

24. The apparatus of claim 21, wherein the memory is a read only memory.

25. The apparatus of claim 21, wherein the wireless device refrains from communicating with the two or more wireless devices.

26. The apparatus of claim 1, wherein the memory is configured to store the single set identifier.

27. The apparatus of claim 21, wherein the memory is configured to store the single set identifier.

* * * * *

UNITED STATES PATENT AND TRADEMARK OFFICE
CERTIFICATE OF CORRECTION

PATENT NO. : 10,034,316 B2
APPLICATION NO. : 15/147680
DATED : July 24, 2018
INVENTOR(S) : Reshef et al.

Page 1 of 1

It is certified that error appears in the above-identified patent and that said Letters Patent is hereby corrected as shown below:

In the Claims

In Column 14, Line 38, in Claim 1, delete "one of the one of the" and insert --one of the-- therefor In Column 16, Line 21, in Claim 18, delete "one of the one of the" and insert --one of the-- therefor In Column 16, Line 30, in Claim 20, after "and", insert --¶--

Signed and Sealed this
Twentieth Day of August, 2019

Andrei Iancu
*Director of the United States Patent and Trademark Office*